Patented Mar. 25, 1941

2,235,862

UNITED STATES PATENT OFFICE 2,235,862

PROCESS FOR THE PREPARATION OF PYRIMIDINE-THIAZOLE COMPOUNDS

Otto Zima, Darmstadt, Germany, assignor to Merck & Co. Inc., Rahway, N. J., a corporation of New Jersey No Drawing. Application February 16, 1938, Serial No. 190,835. In Germany February 22, 1937

13 Claims. (Cl. 260—251)

This invention relates to a process for the preparation of pyrimidine-thiazole compounds, and more particularly to the preparation of pyrimidine-thiazole chloride-hydrochlorides.

An object of the invention is the provision of a simple and direct method of preparing such chloride-hydrochlorides.

Compounds of the formula:

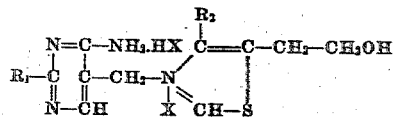

in which $R_1$ and $R_2$ are alkyl radicals such as methyl, ethyl, propyl, etc., and X is an anion, have anti-neuritic properties and are useful in the treatment of beri-beri, polyneuritis and other nervous diseases. The compound in which $R_1$ and $R_2$ are methyl groups, and in which X is chlorine, is the chloride hydrochloride of the anti-neuritic vitamin $B_1$.

Vitamin $B_1$ chloride hydrochloride has been synthesized by reacting 4-methyl-5-β-hydroxyethyl thiazole with 2-methyl-6-amino-5-bromomethyl-pyrimidine hydrobromide, and treating the reaction product with silver chloride. In the first of these steps, the tertiary nitrogen of the thiazole is made quaternary, according to the general equation:

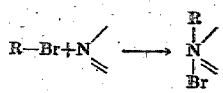

in which R is a radical. It is not practical to directly prepare salts of vitamin $B_1$, for example by the reaction of 2-methyl-6-amino-5-chlormethyl-pyrimidine hydrochloride with 4-methyl-5-β-hydroxyethyl thiazole, because the 5-chlormethyl-pyrimidine compound is difficult to prepare.

I have discovered that vitamin $B_1$ chloride hydrochloride may be easily and directly obtained by condensing a thiazole hydrochloride with a member selected from the group consisting of a 2-alkyl-6-amino-5-alkoxy-methyl-pyrimidine hydrochloride, and 2-alkyl-6-amino-5-hydroxymethyl-pyrimidine hydrochloride. Such a reaction is a surprising discovery, in that quaternary ammonium salts have not heretofore been prepared by a similar method.

Condensation with the hydroxy pyrimidine compound is effected with the splitting off of water, and with the alkoxy pyrimidine with the splitting off of alcohol. The reaction may be carried out in the presence or in the absence of solvents, diluents and/or condensation agents.

The following examples illustrate various methods of carrying out the present invention, but it is to be understood that these examples are by way of illustration and not of limitation.

Example I 3 gms. of 4-methyl-5-β-hydroxyethyl-thiazole-hydrochloride and 4 gms. of 2-methyl-6-amino-5-hydroxymethyl-pyrimidine hydrochloride are heated to 150° C. with stirring. The mixture at first melts, but after about ½ hour, the mass gradually solidifies. It is heated for another ½ hour, cooled, and dissolved in a small amount of water. The solution thus obtained is treated with alcohol until the reaction product crystallizes. Upon recrystallization from aqueous alcohol, 4.8 gms. of pure vitamin $B_1$ chloride hydrochloride, melting point 243° C., is obtained.

Example II 10 gms. of 2-methyl-6-amino-5-methoxymethyl-pyrimidine hydrochloride and 15 gms. of 4-methyl-5-β-hydroxy-ethyl-thiazole hydrochloride are heated with stirring for one hour on the oil bath at an oil-bath temperature of 165-170° C. The reaction mass is cooled, crystallized from absolute alcohol, and recrystallized from aqueous alcohol. Pure vitamin $B_1$ chloride hydrochloride, melting point 243° C., is obtained.

Example III 10 gms. of 2-methyl-6-amino-5-ethoxy-methyl-pyrimidine hydrochloride and 15 gms. of 4-methyl-5-β-hydroxy-ethyl-thiazole hydrochloride are heated on an oil bath for about one hour at 165-170° C. The reaction mixture forms a clear melt, which gradually solidifies to a thick paste with the evolution of gas. The vitamin $B_1$ chloride hydrochloride is recovered as in Example II.

Modifications may be made without departing from the spirit and scope of my invention, and I am to be limited only by the appended claims.

I claim:

1. The process comprising condensing a thiazole hydrochloride with a compound selected from the group consisting of a 2-alkyl-6-amino-5-alkoxy-methyl-pyrimidine hydrochloride, and 2-alkyl-6-amino-5-hydroxymethyl-pyrimidine hydrochloride.

2. The process comprising condensing a thiazole hydrochloride with a compound selected from the group consisting of a 2-methyl-6- amino-5-alkoxy-methyl-pyrimidine hydrochloride, and 2-methyl-6-amino-5-hydroxymethyl-pyrimidine hydrochloride.

3. The process comprising condensing 4-methyl-5-β-hydroxyethyl-thiazole hydrochloride with a compound selected from the group consisting of 2-methyl-6-amino-5-hydroxymethyl-pyrimidine hydrochloride, and a 2-methyl-6-amino-5-alkoxy-methyl-pyrimidine hydrochloride.

4. The process comprising condensing a thiazole hydrochloride with a 2-alkyl-6-amino-5-alkoxy-methyl-pyrimidine hydrochloride.

5. The process comprising condensing a thiazole hydrochloride with a 2-methyl-6-amino-5-alkoxy-methyl-pyrimidine hydrochloride.

6. The process comprising condensing a thiazole hydrochloride with 2-methyl-6-amino-5-methoxy-methyl-pyrimidine hydrochloride.

7. The process comprising condensing a thiazole hydrochloride with 2-methyl-6-amino-5-ethoxy-methyl-pyrimidine hydrochloride.

8. The process comprising condensing 4-methyl-5-β-hydroxyethyl-thiazole hydrochloride with a 2-methyl-6-amino-5-alkoxy-methyl-pyrimidine hydrochloride.

9. The process comprising condensing 4-methyl-5-β-hydroxyethyl-thiazole hydrochloride with 2-methyl-6-amino-5-methoxymethyl-pyrimidine hydrochloride.

10. The process comprising condensing 4-methyl-5-β-hydroxyethyl-thiazole hydrochloride with 2-methyl-6-amino-5-ethoxymethyl-pyrimidine hydrochloride.

11. The process comprising condensing a thiazole hydrochloride with a 2-alkyl-6-amino-5-hydroxymethyl-pyrimidine hydrochloride.

12. The process comprising condensing a thiazole hydrochloride with 2-methyl-6-amino-5-hydroxymethyl-pyrimidine hydrochloride.

13. The process comprising condensing 4-methyl-5-β-hydroxyethyl-thiazole hydrochloride with 2-methyl-6-amino-5-hydroxymethyl pyrimidine hydrochloride.

OTTO ZIMA.